(12) United States Patent
Banipal et al.

(10) Patent No.: US 11,830,011 B2
(45) Date of Patent: Nov. 28, 2023

(54) DYNAMIC RETURN OPTIMIZATION FOR LOSS PREVENTION BASED ON CUSTOMER RETURN PATTERNS

(71) Applicant: International Business Machines Corporation, Armonk, NY (US)

(72) Inventors: Indervir Singh Banipal, Austin, TX (US); Nadiya Kochura, Bolton, MA (US); Shikhar Kwatra, San Jose, CA (US); Sourav Mazumder, Contra Costa, CA (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 17/143,057

(22) Filed: Jan. 6, 2021

(65) Prior Publication Data
US 2022/0215400 A1   Jul. 7, 2022

(51) Int. Cl.
| | | |
|---|---|---|
| *G06Q 30/016* | (2023.01) | |
| *G06Q 10/10* | (2023.01) | |
| *G06Q 10/0837* | (2023.01) | |
| *G06N 3/088* | (2023.01) | |
| *G06Q 20/40* | (2012.01) | |
| *G06Q 10/083* | (2023.01) | |
| *G06N 3/045* | (2023.01) | |

(52) U.S. Cl.
CPC .......... *G06Q 30/016* (2013.01); *G06N 3/045* (2023.01); *G06N 3/088* (2013.01); *G06Q 10/0837* (2013.01); *G06Q 10/0838* (2013.01); *G06Q 10/10* (2013.01); *G06Q 20/407* (2013.01)

(58) Field of Classification Search
CPC ............ G06Q 30/016; G06Q 10/0837; G06Q 10/0838; G06Q 10/10; G06Q 20/407; G06N 3/0454; G06N 3/088
See application file for complete search history.

(56) References Cited

U.S. PATENT DOCUMENTS

| | | |
|---|---|---|
| 8,036,905 B2 | 10/2011 | Siegel |
| 9,646,319 B2 | 5/2017 | Hammond et al. |
| 10,271,161 B2 | 4/2019 | Syed et al. |
| 10,290,002 B1 | 5/2019 | Cunningham et al. |
| 10,497,000 B1 | 12/2019 | Barstad et al. |

(Continued)

OTHER PUBLICATIONS

Kou, Yufeng, et al. "Survey of fraud detection techniques." IEEE International Conference on Networking, Sensing and Control, 2004. vol. 2. IEEE, 2004. (Year: 2004).*

(Continued)

*Primary Examiner* — Laura Yesildag
*Assistant Examiner* — Corey Russ
(74) *Attorney, Agent, or Firm* — Stephanie Carusillo; Madeline F. Schiesser; Keohane & D'Alessandro, PLLC

(57) ABSTRACT

Approaches presented herein enable dynamically determining a validity of a return. More specifically, a system obtains a return request from a customer, a transaction history of the customer, and a set of return policy rules. A generative adversarial network (GAN) trained to detect non-genuine returns is applied to the return request. The GAN uses, among other this, the transaction history of the customer and the set of return policy rules as parameters of the GAN. Based on an output of the GAN, at least one return processing action is recommended and implemented.

20 Claims, 5 Drawing Sheets

(56) References Cited

U.S. PATENT DOCUMENTS

| | | | |
|---|---|---|---|
| 11,276,023 B1* | 3/2022 | Butler | G06Q 20/4016 |
| 2003/0225625 A1* | 12/2003 | Chew | G06Q 20/209 |
| | | | 705/24 |
| 2004/0143518 A1* | 7/2004 | Siegel | G06Q 30/0601 |
| | | | 705/28 |
| 2005/0043857 A1 | 2/2005 | Van Fleet | |
| 2008/0319801 A1* | 12/2008 | Wilson | G06Q 10/10 |
| | | | 705/4 |
| 2009/0048934 A1* | 2/2009 | Haddad | G06Q 40/12 |
| | | | 705/17 |
| 2012/0078739 A1* | 3/2012 | Maraz | G06Q 30/012 |
| | | | 705/318 |
| 2012/0185400 A1* | 7/2012 | Eubanks, Jr. | G06Q 30/016 |
| | | | 705/304 |
| 2012/0226620 A1* | 9/2012 | Junger | G06Q 30/00 |
| | | | 705/304 |
| 2014/0172697 A1 | 6/2014 | Ward et al. | |
| 2014/0172726 A1 | 6/2014 | Junger et al. | |
| 2014/0257927 A1* | 9/2014 | Brock | G06Q 30/016 |
| | | | 705/26.7 |
| 2016/0063502 A1* | 3/2016 | Adjaoute | G06Q 20/4016 |
| | | | 705/44 |
| 2016/0148209 A1* | 5/2016 | Hammond | G06Q 30/016 |
| | | | 705/21 |
| 2016/0321661 A1* | 11/2016 | Hammond | G06Q 20/20 |
| 2017/0293916 A1 | 10/2017 | Humphrys et al. | |
| 2018/0096298 A1 | 4/2018 | Twizeyimana et al. | |
| 2018/0130071 A1 | 5/2018 | Yao et al. | |
| 2018/0144301 A1* | 5/2018 | Engel | G06Q 10/0837 |
| 2019/0147444 A1 | 5/2019 | Nelms et al. | |
| 2020/0065812 A1* | 2/2020 | Walters | G06N 3/0454 |
| 2020/0175528 A1 | 6/2020 | Bazari et al. | |
| 2020/0250671 A1 | 8/2020 | Thomas et al. | |
| 2020/0372562 A1* | 11/2020 | Sanghavi | G06N 20/00 |
| 2021/0049606 A1* | 2/2021 | Garcia | G06F 18/214 |
| 2021/0049684 A1* | 2/2021 | Chen | G06Q 40/00 |
| 2021/0166243 A1* | 6/2021 | Kentris | G06Q 30/0635 |
| 2022/0044329 A1* | 2/2022 | Bertagnolli | G06N 3/084 |
| 2022/0101192 A1* | 3/2022 | Patel | G06N 7/01 |
| 2022/0122091 A1* | 4/2022 | An | G06Q 20/407 |
| 2022/0147927 A1* | 5/2022 | Kieboom | G06Q 10/0837 |
| 2022/0198529 A1* | 6/2022 | Zhang | G06Q 30/0281 |

OTHER PUBLICATIONS

Ba, Hung, "Improving Detection of Credit Card Fraudulent Transactions using Generative Adversarial Networks", Jul. 7, 2019, 10 pgs.

Zheng, Panpan et al., "One-Class Adversarial Nets for Fraud Detection", Jun. 5, 2018, 10 pgs.

Rittman, Tom, "Nine Tactics Consumers Use to Make Fraudulent Returns", Dec. 3, 2012, 7 pgs.

Hudson, Matthew, "How to Recognizing Retail Return Fraud", https://www.thebalancesmb.com/recognizing-return-fraud-2890255, Jan. 27, 2020, 11 pgs.

Katteryna Lysenko-Ryba, "The Use of Modeling in the Process of Customer Return Management", University of Information Technology and Management in Rzeszow, May 2019, pp. 83-95.

Hu et al., "Return Mode Selection and Pricing Strategy for a Dual-Channel Retailer", Disrete Dynamics in Nature and Society, Article ID 5261486, Aug. 1, 2020, 20 pages.

Zhu et al., "A Local Algorithm for Product Return Prediction in E-Commerce", IJCAI '18, 27th International Joint Conference, Jul. 2018, pp. 3718-3724.

Bjorn Asdecker, "Returning mail-order goods: analyzing the relationship between the rate of returns and the associated costs", Logistics Research, vol. 8, Article 3, Jul. 31, 2015, 12 pages.

* cited by examiner

DYNAMIC RETURN OPTIMIZATION FOR LOSS PREVENTION BASED ON CUSTOMER RETURN PATTERNS

TECHNICAL FIELD

The present invention relates generally to distinguishing between genuine and non-genuine returns and, more specifically, to optimizing a returns policy for a given customer based on a returns history of that customer.

BACKGROUND

Many retailers, both online and brick-and-mortar, have return policies that permit customers to return a previously purchased product under certain conditions. Examples of such conditions include, but are not limited to, time limits (e.g., within 90 days of purchase), object state (e.g., like new, not worn outside), and/or packaging state (e.g., unopened, tags still attached). These return conditions are generally part of a loss prevention policy intended to mitigate the return of products that are no longer in a fit state to be sold. However, some purchasers may attempt to take advantage of return policies and try to pass off items that are no longer in a fit state to be sold, even if within the literal confines of the return policy. This leaves retailers to absorb now-defective returned items.

SUMMARY

Approaches presented herein enable dynamically determining a validity of a return. More specifically, a system obtains a return request from a customer, a transaction history of the customer, and a set of return policy rules. A generative adversarial network (GAN) trained to detect non-genuine returns is applied to the return request. The GAN uses, among other things, the transaction history of the customer and the set of return policy rules as parameters of the GAN. Based on an output of the GAN, at least one return processing action is recommended and implemented.

One aspect of the present invention includes a method for dynamically determining a validity of a return, the method comprising: obtaining a return request from a customer, a transaction history of the customer, and a set of return policy rules; applying a GAN trained to detect non-genuine returns to the return request, the transaction history of the customer and the set of return policy rules being parameters of the GAN; and recommending at least one return processing action based on an output of the GAN.

Another aspect of the present invention includes a computer system for dynamically determining a validity of a return, the computer system comprising: a memory medium comprising program instructions; a bus coupled to the memory medium; and a processor, for carrying out the program instructions, coupled to a dynamic return validation engine via the bus that when carrying out the program instructions causes the system to: obtain a return request from a customer, a transaction history of the customer, and a set of return policy rules; apply GAN trained to detect non-genuine returns to the return request, the transaction history of the customer and the set of return policy rules being parameters of the GAN; and recommend at least one return processing action based on an output of the GAN.

Yet another aspect of the present invention includes a computer program product for dynamically determining a validity of a return, the computer program product comprising a computer readable hardware storage device, and program instructions stored on the computer readable hardware storage device, to: obtain a return request from a customer, a transaction history of the customer, and a set of return policy rules; apply a GAN trained to detect non-genuine returns to the return request, the transaction history of the customer and the set of return policy rules being parameters of the GAN; and recommend at least one return processing action based on an output of the GAN.

Still yet, any of the components of the present invention could be deployed, managed, serviced, etc., by a service provider who offers to implement passive monitoring in a computer system.

Embodiments of the present invention also provide related systems, methods, and/or computer program products.

BRIEF DESCRIPTION OF THE DRAWINGS

These and other features of this invention will be more readily understood from the following detailed description of the various aspects of the invention taken in conjunction with the accompanying drawings in which.

Figure 1:
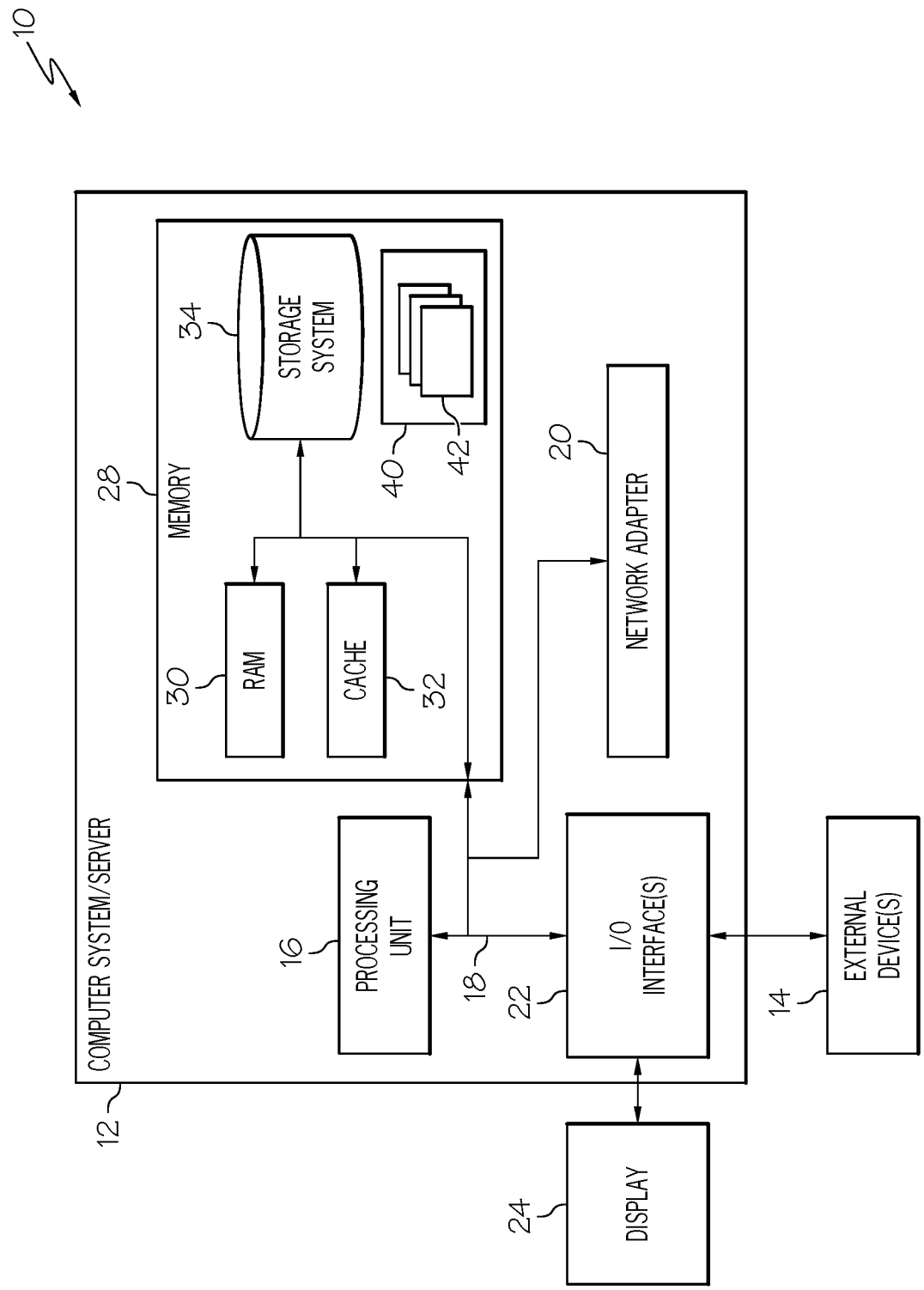
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As discussed above, approaches presented herein enable dynamically determining a validity of a return. More specifically, a system obtains a return request from a customer, a transaction history of the customer, and a set of return policy rules. A generative adversarial network (GAN) trained to detect non-genuine returns is applied to the return request. The GAN uses, among other things, the transaction history of the customer and the set of return policy rules as parameters of the GAN. Based on an output of the GAN, at least one return processing action is recommended and implemented.

Embodiments of the present invention recognize that return policies instituted by retailers, particularly online (e-commerce) retailers, are ineffective at minimizing loss due to excessive fraudulently-intended returns. For example, online retailers sometimes have customers who repeatedly buy an item/product and use it, only to then initiate a return on the final day of a return eligibility period. On the other hand, it is also possible that some returns initiated just inside a return window are benignly-intended, due to some issue with the product or other genuine reason for return. As such, there is a need to put into effect a return policy capable of distinguishing between genuinely-intended and non-genuinely-intended returns.

Accordingly, embodiments of the present invention provide a system that uses GAN based and reinforced-learning enabled capabilities to effectively detect non-genuine return patterns, initiate an alert to an administrator or return-handling computer system, and carryout a return refusal/acceptance strategy responsive to the detection and input from the administrator. More specifically, embodiments of the present invention provide a GAN based returns authenticity validation system that can be used to determine whether it is financially beneficial for the enterprise to accept a return in response to predicted future behavior of a customer based on the customer's past behavior. Responsive to this determination, embodiments of the present invention can generate set of proposed actions to apply to the customer's return to maximize the impact of providing credit/discounts or providing a return timeline to the customer, or not. A reason for the return action can be expressed to the customer or reviewed by an administrator in the interest of reinforced learning.

Furthermore, embodiments of the present invention offer several advantages over existing return systems by enabling dynamic determination of a validity of a return. Such advantages enhance existing return systems by measuring whether it is worth the expenditure of time, money, or other resources to serve and/or comply with a return request. This improves the efficiency and value of such return systems by enhancing loss prevention policies while maintaining positive relationships with customers requesting genuine returns. Customers who have repeatedly "gamed" a retailer's return policy can be identified and their return requests handled in such a way as to disincentivize such practices in the future (e.g., only a partial refund, a requirement to pay for their own return shipping, etc.), while customers who are merely unlucky (e.g., shipping company tends to damage goods on route to customer's home) continue to receive the benefits of the return policy.

Referring now to FIG. 1, a computerized implementation 10 of an embodiment for dynamically determining a validity of a return will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other (e.g., special purpose) computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server implementable instructions, such as program modules, being carried out by a computer system. Generally, program modules may include routines, programs, objects, components, logic, data structures, and so on, that perform particular tasks or implement particular abstract data types. In this particular example, computer system/server 12 represents an illustrative system for dynamically determining a validity of a return. It should be understood that any other computers implemented under the present invention may have different components/software, but can perform similar functions.

Computer system/server 12 in computerized implementation 10 is shown in the form of a computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 carries out computer program code, such as program code for dynamically determining a validity of a return, which is stored in memory 28, storage system 34, and/or program/utility 40. While carrying out computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
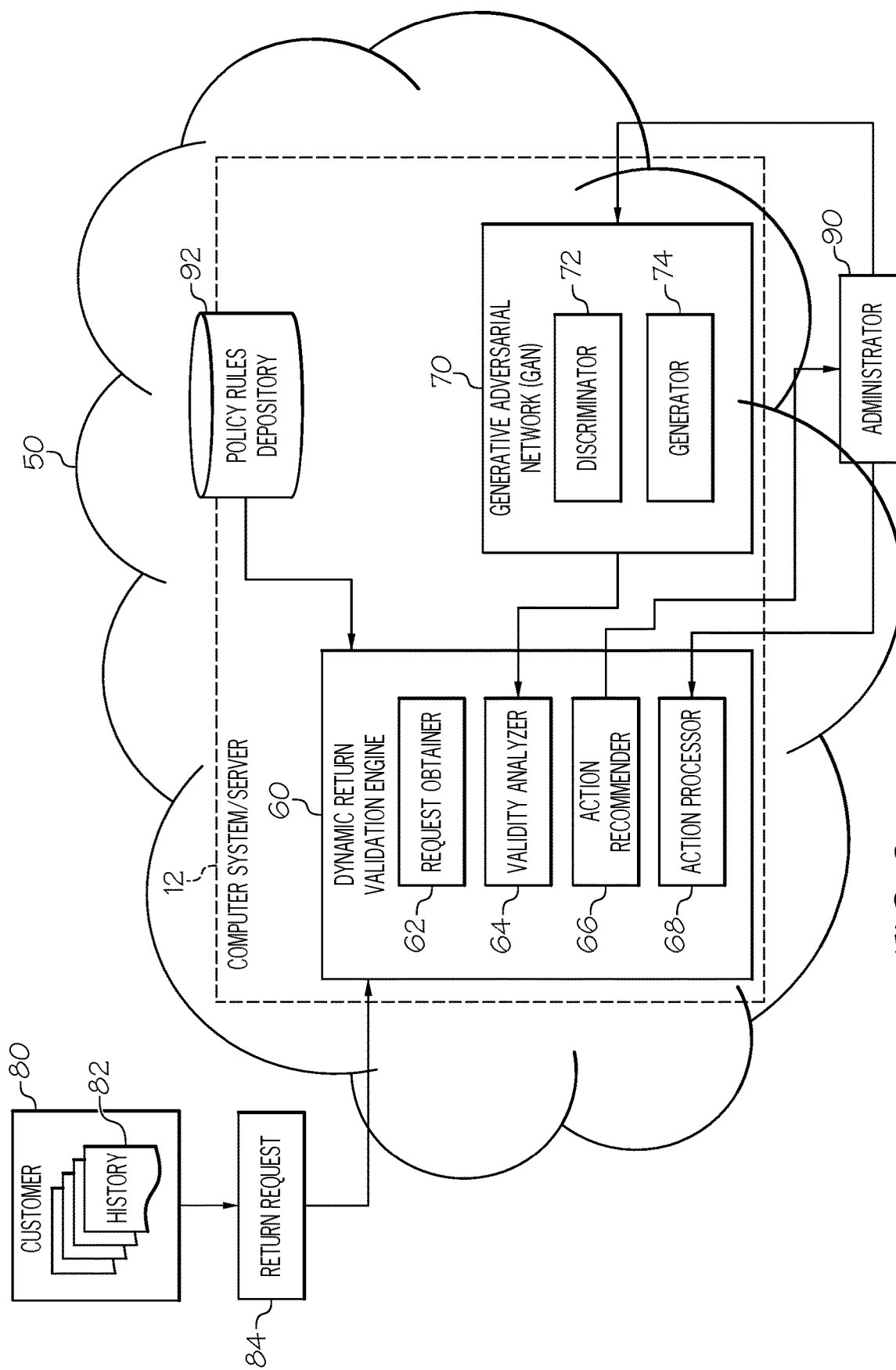
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment 50). A stand-alone computer system/server 12 is shown in FIG. 2 for illustrative purposes only. In the event the teachings recited herein are practiced in a networked computing environment, each client need not have a dynamic return validation engine 60 (hereinafter "system 60"). Rather, all or part of system 60 could be loaded on a server or server-capable device that communicates (e.g., wirelessly) with the clients to provide for dynamically determining a validity of a return. Regardless, as depicted, system 60 is shown within computer system/server 12. In general, system 60 can be implemented as program/utility 40 on computer system 12 of FIG. 1 and can enable the functions recited herein.

Along these lines, system 60 may perform multiple functions. Specifically, among other functions, system 60 can dynamically determine a validity of a return in a networked computing environment. To accomplish this, system 60 can include a set of components (e.g., program modules 42 of FIG. 1) for carrying out embodiments of the present invention. These components can include, but are not limited to, request obtainer 62, validity analyzer 64, action recommender 66, and action processor 68.

System 60 can be in communication with a Generative Adversarial Network (GAN) 70 having a discriminator model 72 and a generator model 74. In some embodiments, GAN 70 can reside on a same computer system 12 as system 60. In still other embodiments, GAN 70 can reside on a different computer system within 12 computing environment 50, or even in a separate computing environment.

GAN 70 provides an analysis framework for validity analyzer 64. GAN 70 can receive feedback from an administrator 90 responsive to actions recommend by action recommender 66. System 60 can also receive feedback and other input from administrator 90. System 60 and/or GAN 70 can also be in communication with a database storing a set of return policy rules 92.

According to some embodiments of the present invention, system 60 can receive/obtain a return request 84 initiated by a customer 80 having a customer purchase/return history 82.

More specifically, according to some embodiments of the present invention, request obtainer 62, as performed by computer system/server 12, obtains a return request 84 from a customer 80, a transaction history 82 of the customer 80, and a set of return policy rules 92. Return request 84 can be initiated any way presently known or later developed. In some embodiments, such as those being carried out on an e-commerce website, a return request can be entered by customer 80 through a user interface webpage designed for receiving return requests. In still other embodiments, such as those used by brick-and-mortar retailers, return request 84 can be entered by an employee into computer system 12 responsive to a customer bringing an item for return to a customer service desk.

According to some embodiments, return request 84 can include information such as an identification of the item being returned, an identification of customer 80 who requested the return, and/or a record (e.g., a receipt or invoice) of a sale in which the item was originally obtained by customer 80. In some embodiments, the identification of customer 80 can be linked to an account (e.g., an e-commerce account) belonging to customer 80. Request obtainer 62 can retrieve information about a past transactions history 82 of customer 80 from this account.

Past transaction history 82 can include, but is not limited to, a ratio of past returns to past purchases (e.g., based on dollar amount or number of transactions or number of items, etc.), a ratio of items not returned against a past purchases total (based on dollar amount or number of transactions or number of items, etc.), timing and/or context of previous returns, total previous purchases, past spending, time spent browsing, quantity of purchases relative to browsing, behavior in past responsive to past return actions, condition of previously returned items, etc. Request obtainer 62 can also obtain metadata about other items/products bought by customer 80 and a return history of those items/products. As will be described in further detail below, such metadata can be used by validity analyzer 64 to theorize a potential rhyme or reason behind previous return requests placed by customer 80.

Additionally or in the alternative, request obtainer 62 can use the identification of the item being returned and/or the record of the sale in which the item was originally obtained to search for historical patterns with respect to that item or a same type of item. For example, from item history, request obtainer 62 may obtain information indicating that the same type of items are most frequently returned within the 5 days before the end of the return window. In another example, request obtainer 62 may obtain information indicating that, upon inspection of previous returns of the same item, a manufacturer's defect was found.

In addition to obtaining information on past return order history of customer 80, number of days after which customer 80 returned past orders, and/or the type, price, and/or pattern of past returned products by customer 80, request obtainer 62 can obtain information on the context, situation, and other environment-based parameters surrounding the return. For example, the airing of a major sporting event the previous weekend may be relevant to an attempt to return a wide-screen TV the following Monday. Similarly, an end of a season may be relevant to an attempt to return items typically only used during that season (e.g., skis, patio furniture).

Figure 3:
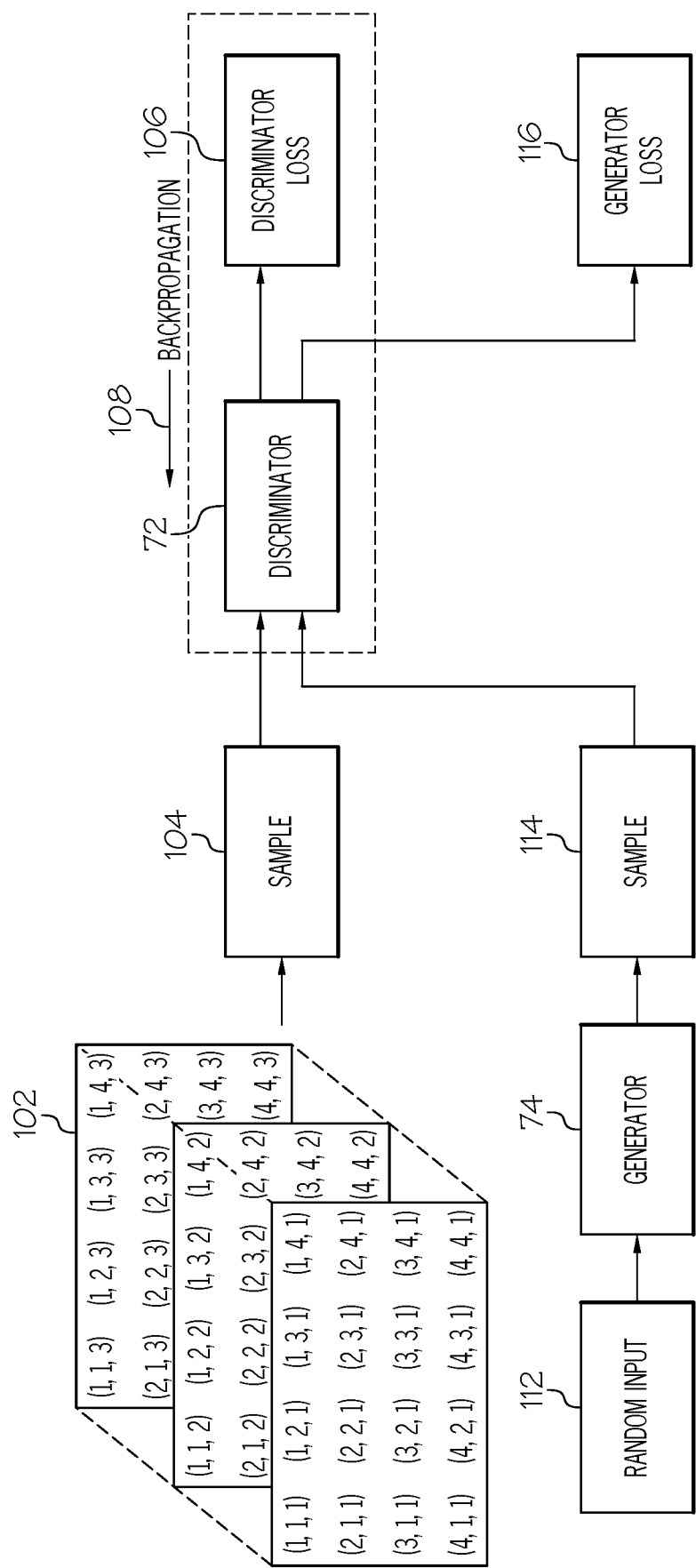
FIG. 3 shows training a generative adversarial network (GAN) using a discriminator and a generator according to illustrative embodiments.

Referring now to FIG. 3 in connection with FIG. 2, training of GAN 70, having a discriminator 72 and a generator 74 is discussed in further detail. According to embodiments of the present invention, validity analyzer 64, as performed by computer system/server 12, applies GAN 70 trained to detect non-genuine returns to return request 84. Transaction history 82 of customer 80 and the set of return policy rules 92 are, inter alia, parameters of GAN 70.

Although not discussed in exhaustive detail here, it should be understood that a GAN is a class of machine learning in which two neural networks contest with each other in a zero-sum game, such that one neural network (e.g., a generator) agent's gain is another neural network (e.g., a discriminator) agent's loss. In this type of machine learning, the goal is to "fool" a discriminator, which in turn is dynamically updated based on its successes and failures. As such, given a training set, a GAN can learn in an unsupervised or supervised manner to generate new data that has the same statistics as the training set.

According to some embodiments of the present invention, GAN 70 is trained in an adversarial zero-sum game on a supervised learning problem using generator model 72, which generates example disingenuous return scenarios, and discriminator model 74, which classifies the examples as either real (i.e., from a domain of genuine historical returns) or false (i.e., generated by generator model 72). In other words, the training of GAN 70 to distinguish between returns that are genuinely intended and returns which are deceitfully intended is framed as a supervised learning problem. Once discriminator model 74 is fooled about half the time, it can be inferred that generator model 72 is generating plausible examples.

Validity analyzer 64 can generate multi-dimensional vectors 102 from features retrieved by request obtainer 62 that may be used to determine whether a return order is genuine. Examples of such features, as discussed above, can include, but are not limited to a past return order history of the customer; a context, situation, and/or environment surrounding the return request; number of days after which the customer returned past orders relative to a return deadline; type, price, and/or any other pattern of past returned products/items; and/or other bought products and their return history as expressed through metadata. Although these examples are explicitly recited here, it will be appreciated by those trained in the art that similar features providing context to a return request are within the scope of the invention and may be used by validity analyzer 64.

Features of the return request, such as, but not limited to, those described above, can be standardized into multi-dimensional vectors by validity analyzer 64. Although not described in great detail here in the interest of brevity, it will be understood by those trained in the art that features of the return request can be standardized, normalized, and/or regularized in order to produce comparable vectors having aligned features. In some embodiments, validity analyzer 64 can assign features of the return a numerical value and place that value in an appropriate position in multi-dimensional vector 102. The assignment of a numerical value can be based on a categorization of the feature of the return request, such as rating a severity of a feature on a scale of low, moderate, or high.

Samples 104, illustrating features of a genuine return request example, of such multi-dimensional vectors/matrix 102 can be fed into discriminator 72, which is trained to determine whether the sample is from a domain of genuine historical returns or generated by generator model 72, which will be described in more detail below.

Generator 74 generates disingenuous return request scenarios (samples 114) based on random input 112 from historical records of non-genuine return requests. In other words, generator 74 can automatically (e.g., randomly, round-robin, or some other selection algorithm that generates feature permutations) pull features from return requests that have been tagged or otherwise marked (e.g., by an administrator) non-genuine/fraudulent to simulate an example disingenuous return request sample 114. In some embodiments, a multi-dimensional matrix holding such non-genuine features can be formed and used for this training simulation. Discriminator 72 will sometimes be successful (generator loss 116) and sometimes be unsuccessful (discriminator loss 106) at differentiating between generator-based samples 114 and genuine samples 104. These wins and losses can be fed back to discriminator 72 through a supervised/reinforced learning training algorithm, such as backpropagation 108. Although some embodiments of the present invention perform supervised learning through backpropagation 108, it should be understood that other forms of supervised learning may additionally or alternatively be used to train discriminator 72. Discriminator 72 refines its ability to distinguish between genuine sample 104 and disingenuous sample 114 based on such supervised/reinforced learning.

Generator 74 can generate very close examples of scenarios which are on a thin line where, while it may appear that a customer is returning a product due to a genuine reason, the customer is not actually making a genuine return. Over time, discriminator 72 learns ground truths from analyzing real returns versus tricky scenarios generated by generator 74 and, as such, learns to distinguish non-genuine scenarios over time.

Some embodiments of the present invention rely on structure mapping experts (SME) or ground truth experts who provide or validate the initial model building processes of the supervised/reinforced learning training algorithm. These experts can provide a set of ground truths as a starting point for the algorithm. Examples of such expert-provided ground truths may include, but are certainty not limited to, whether a product being returned was genuinely defective, whether a customer simply has a habit of changing their mind and returning products, or whether all returns of a particular product were sent to a particular geographic area, suggesting shipments get damaged when going through a particular route. Such ground truths can be fed back into GAN 70, allowing it to derive additional ground truths and learn further.

Returning now to the system 60, validity analyzer 64 can apply trained GAN 70 to return request 84. Policy rules 92 form at least one parameter of GAN 70. Based on policy rules 92 and information included in or with return request 84, such as product ID and/or history, customer ID and/or history, original transaction details, and other circumstances surrounding the request, GAN 70 can produce a determination as to whether return request 84 is genuine or not.

According to embodiments of the present invention, action recommender 66, as performed by computer system/server 12, recommends at least one return processing action based on an output of GAN 70. In some embodiments, GAN 70 can also be trained to identify optimal return actions responsive to a non-genuine determination based on received variables. In still other embodiments, action recommender 66 can be independently trained to determine such return actions. Such return actions can be selected to result in the best enterprise benefit (e.g., continued genuine patronage from the customer) balanced against expending resources to process a non-genuine return request (e.g., by providing a credit/refund, return timeline, and/or return shipping). For example, action recommender 66 may determine that offering a customer making a first non-genuine return a partial credit increases that customer's likelihood of future purchases. In a contrasting example, action recommender 66 may determine that the customer making the non-genuine return has done so several times already (and is likely to continue to do so), and, therefore, there is no benefit to allowing them to do so again. If return request 84 is genuine, action recommender 66 recommends that the return be permitted to proceed.

In some embodiments, action recommender 66 can assign a severity/vulnerability score to return request 84 based on a classification of the output of GAN 70. This severity score can be a rating on a scale (e.g., 0-100, 0-1, low to high, green to red, etc.) of an egregiousness of a disingenuous return request. For example, a customer attempting to return an item on the last day of a return period, having done the same thing two times already, would receive a higher severity score than a customer doing so for the first time. Based on the severity score, action recommender 66 can recommend an action with which to respond to the disingenuous return request.

For example, in response to a severity score of 0.9/1, the return can be completely blocked, as such a score indicates that the customer is attempting to take advantage of the goodwill of the return system (e.g., returning a mattress on the 89th day of a 90-day return period multiple times over a year). By contrast, in another example, in response to a severity score of 0.5/1, action recommender 66 can suggest a partial credit/refund. In this example, GAN 70 has determined that, while the particular customer returns products frequently, he lives in a remote location, causing products to become damaged in transport. Still, the customer has returned too many products in the past for it to be beneficial to continue to fully service such return requests.

Responsive to a disingenuous return request determination at validity analyzer 64, action recommender 66 can recommend actions including, but not limited to, blocking the return, allowing the return, and partially allowing the return by, for example, reimbursing a portion of a fee paid by the customer. In some embodiments, action recommender 66 can generate a list of potential actions based on the severity/vulnerability score. In the case that a partial return is permitted, action recommender 66 can suggest to what degree/percentage the return is permitted based on the strength of the severity score. For example, action recommender 66 may recommend a refund inversely proportional to the severity score, offering an 80% refund in response to a 0.2/1 severity score.

It will be appreciated by those trained in the art that other refund processing actions may be recommended beyond disallowing, allowing, and partially refunding. For example, action recommender 66 may suggest a return for a full refund but require that the customer pay his own shipping. In another example, action recommender 66 may suggest disallowing a monetary refund, but permit an exchange of the returning item for a different item or for another one of the same item. In some embodiments, action recommender 66 can rank return actions based on which are most likely to be most beneficial to the enterprise.

In some embodiments, action recommender 66 can include in the ranked/prioritized list (or in any other output of action recommender 66) a reasoning behind the recommended action(s). Such reasonings can include, for example, but are not limited to, an indication that system 60 has determined that the return is not genuine, to more detailed explanations, citing the most significant features leading to the negative determination. For instance, action recommender 66 may indicate that the customer has made too many returns in the past months, or has a history of returning products right before a deadline, or that the item being returned is seasonal and it is currently the end of the season.

According to some embodiments of the present invention, action processor 68 can enact one or more return actions recommended by action recommender 66. In some embodiments, action processor 68 can initiate such actions automatically. In still other embodiments, action processor 68 can obtain a selection of a return action by an administrator or other user responsive to the prioritized/ranked list outputted by action recommender 66 to that administrator/user. In still other embodiments, action processor 68 can provide an administrator/user a time interval to make a selection and, in the case no selection is made, automatically default to the highest ranked action.

Figure 4:
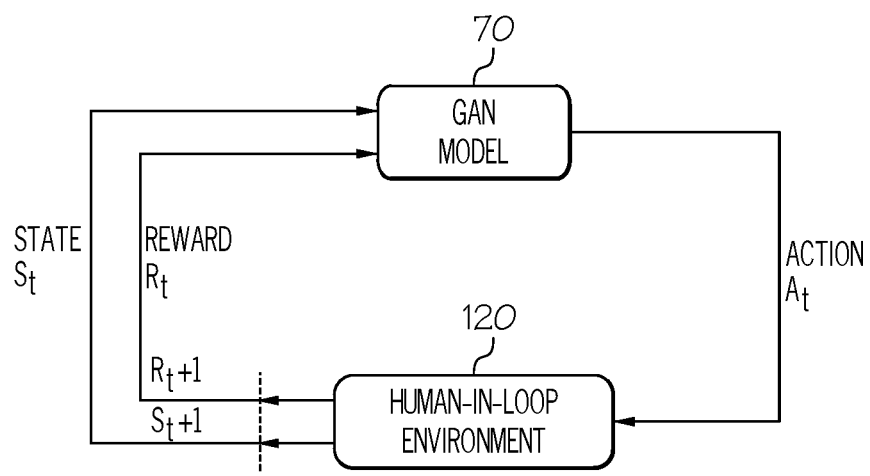
FIG. 4 shows an interaction between a GAN and human-in-loop system according to illustrative embodiments.

Referring now to FIG. 4 in connection with FIG. 2, an interaction between GAN 70 and human-in-loop system 120 is shown. According to some embodiments of the present invention, GAN 70 can be supplemented by human-in-loop routine 120 to guide validity analyzer 64 through tough calls and provide additional teaching to discriminator 72. According to some embodiments of the present invention, when an output of discriminator 72 of GAN 70 is within a low confidence threshold (and/or in the interest of hypothesis testing), validity analyzer 64 can trigger an alarm prompting a review of the output by a human-in-loop administrator 90. Administrator 90 can provide feedback validating or invalidating an accuracy of the output of discriminator 72. This administrator feedback can provide additional reinforced machine learning to discriminator 72.

In some embodiments, the validation-request alarm can also or in the alternative be triggered responsive to an objection by customer 80 to a return action. In such embodiments, human-in-loop system 120 is used to verify whether the alarm was justifiably triggered by customer 80 or not. As discussed above, GAN 70 can be further refined based on administrative verification of the output of GAN 70.

According to some embodiments of the present invention, responsive to a user/administrator selecting a return processing action, action recommender 66 can output to customer 80 a reason for the selected return processing action. In some embodiments, this return action reasoning can be taken from the prioritized recommended returns actions list. In still other embodiments, action recommender 66 can use an explainability mechanism to translate the logic of GAN 70 into a human-understandable rational.

The explainability mechanism can access the features of refund request 84 used in GAN 70 by validity analyzer 64, such as a past sequence of actions and/or a history stored for customer 80. If the feature information is sufficient for analysis, data points are perturbed around a median value in order to inspect if accepting a disingenuous return would result in favorably modified customer purchase and spending patterns. A contrastive explainability algorithm can be applied on data inputs to GAN 70 in order to act upon the varying median and finding from a customer dataset if outcomes vary over $\Delta_t$ durations of time. Using contrastive explainability, system 60 can perturb the features input into GAN 70 in order to determine the corresponding variation reflected in the output. Based on the perturbation in the input features, generator 74 can synthesize variations in output maxima and minima for generating the same output or a minimum variations in the input features required to generate a different output. The reasoning provided by the contrastive explainability mechanism can be used to illustrate a correlation between historical data about customer 80 and an estimated financial value to the enterprise based on those previous transactions.

It will be appreciated that by running refund request 84 through GAN 70, system 60 can produce, in real-time, a customer-customized return policy can be devised in view of features surrounding return request 84, including past transactions of customer 80, a relationship between policy rules 92 and return request 84, a context of return request 84, and informational metadata about previous items bought and returned from an overall customer population. As such, system 60 offers improvements to current return systems by enabling a dynamically customized return policy feature.

Figure 5:
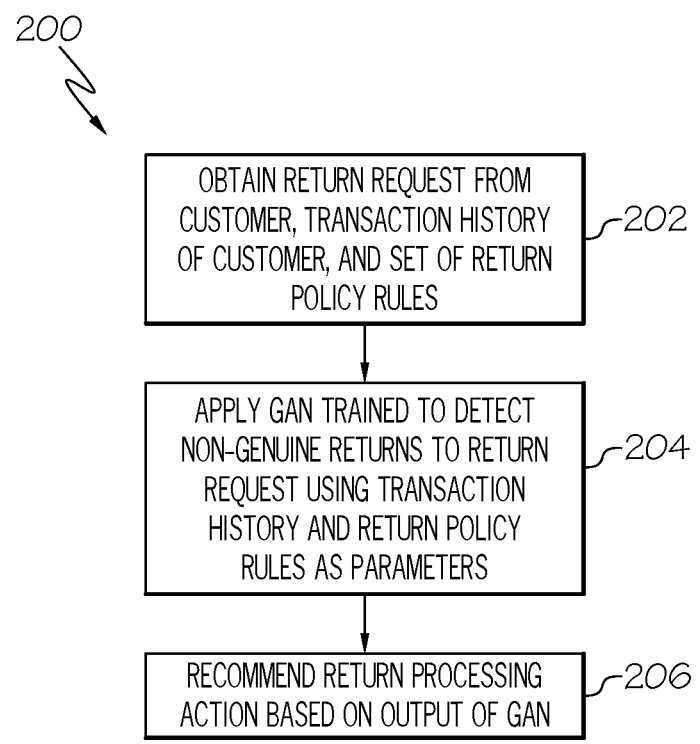
FIG. 5 shows a process flowchart for dynamically determining a validity of a return according to illustrative embodiments.

As depicted in FIG. 5, in one embodiment, a system (e.g., computer system/server 12) carries out the methodologies disclosed herein. Shown is a process flowchart 200 for dynamically determining a validity of a return. At 202, return request 84 is obtained from customer 80; a transaction history 82 of customer 80 and a set of return policy rules 92 are also obtained. At 204, GAN 70, trained to detect non-genuine returns, is applied to the return request. Transaction history 82 of customer 80 and the set of return policy rules 92 are parameters of GAN 70. At 206, at least one return processing action is recommended based on an output of the GAN.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for implementation by various types of processors. A system or unit or component of implementable code may, for instance, comprise one or more physical or logical blocks of computer instructions, which may, for instance, be organized as an object, procedure, or function. Nevertheless, the implementable of an identified system or unit need not be physically located together, but may comprise disparate instructions stored in different locations which, when joined logically together, comprise the system or unit and achieve the stated purpose for the system or unit.

Further, a system or unit of implementable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software implementable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for dynamically determining a validity of a return. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for dynamically determining a validity of a return. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for implementation by a hardware element, such as a processor. Program instructions may include an organized list of commands comprising words, values, or symbols arranged in a predetermined syntax that, when implemented, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction implementation device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may be carried out entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may perform the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which implemented via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which carry out on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more implementable instructions for implementing the specified logical function(s). In some alternative implementations, the functions noted in the blocks may occur out of the order noted in the Figures. For example, two blocks shown in succession may, in fact, be accomplished as one step, implemented concurrently, substantially concurrently, in a partially or wholly temporally overlapping manner, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to dynamically determine a validity of a return. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for dynamically determining a validity of a return, the method comprising:
   training a generative adversarial network (GAN) to detect non-genuine returns using a generator model that generates example return scenarios from a multi-dimensional matrix holding features of non-valid returns and a discriminator model trained in an adversarial zero-sum game in a supervised learning environment to identify features of non-valid returns by classifying a return as from a domain of genuine historical returns or from the generator model, wherein the example return scenarios each comprise features extracted from a plurality of different historic records of non-valid returns;
   obtaining a return request from a customer, a transaction history of the customer, and a set of return policy rules;
   standardizing features of the return request into a multi-dimensional vector having numerical values representing the features in suitable positions in the multi-dimensional vector;
   applying the GAN to the standardized vector of the return request, the transaction history of the customer and the set of return policy rules being parameters of the GAN;
   generating, based on the application of the GAN, a score indicating an egregiousness of the return request, wherein the generated score is fed back into the GAN to reinforce learning;
   ranking a set of return processing action recommendations, each recommendation citing a theorized reason for the customer initiating the return request based on features of the return request standardized into the multi-dimensional vector; and
   recommending at least one return processing action with supporting theorized return reasoning based on an output of the GAN, the recommendation being an optimal return action based on the features and comprising a partial return that is proportional to the egregiousness score.

2. The method of claim 1, the parameters of the GAN further comprising: a past returned order history of the customer, a number of days after which the customer returned past orders, a context of the return request, and metadata about previous items bought and returned.

3. The method of claim 1, wherein the action is selected from the group consisting of: blocking the return, allowing the return, and reimbursing a portion of a fee paid by the customer.

4. The method of claim 3, responsive to a user selecting a return processing action of the at least one return processing actions, outputting to the customer a reason for the selected return processing action.

5. The method of claim 1, wherein the GAN is trained in an adversarial zero-sum game on a supervised learning problem using a generator model that generates example return scenarios and a discriminator model that classifies examples as either real or fake.

6. The method of claim 5, wherein an alarm triggering a review by a human-in-loop is generated in the case an output of the discriminator is within a low confidence threshold, the human-in-loop providing feedback indicating an accuracy of the output of the discriminator.

7. The method of claim 1, the method further comprising:
verifying the return processing action with a human administrator responsive to an objection from the customer; and
updating the GAN responsive to verification feedback from the human administrator.

8. A computer system for dynamically determining a validity of a return, the computer system comprising:
a memory medium comprising program instructions;
a bus coupled to the memory medium; and
a processor, for carrying out the program instructions, coupled to a dynamic return validation engine via the bus that when carrying out the program instructions causes the system to:
train a generative adversarial network (GAN) to detect non-genuine returns using a generator model that generates example return scenarios from a multi-dimensional matrix holding features of non-valid returns and a discriminator model trained in an adversarial zero-sum game in a supervised learning environment to identify features of non-valid returns by classifying a return as from a domain of genuine historical returns or from the generator model, wherein the example return scenarios each comprise features extracted from a plurality of different historic records of non-valid returns;
obtain a return request from a customer, a transaction history of the customer, and a set of return policy rules;
standardize features of the return request into a multi-dimensional vector having numerical values representing the features in suitable positions in the multi-dimensional vector;
apply the GAN to the standardized vector of the return request, the transaction history of the customer and the set of return policy rules being parameters of the GAN;
generate, based on the application of the GAN, a score indicating an egregiousness of the return request, wherein the generated score is fed back into the GAN to reinforce learning;
rank a set of return processing action recommendations, each recommendation citing a theorized reason for the customer initiating the return request based on features of the return request standardized into the multi-dimensional vector; and
recommend at least one return processing action with supporting theorized return reasoning based on an output of the GAN, the recommendation being an optimal return action based on the features and comprising a partial return that is proportional to the egregiousness score.

9. The computer system of claim 8, the parameters of the GAN further comprising: a past returned order history of the customer, a number of days after which the customer returned past orders, a context of the return request, and metadata about previous items bought and returned.

10. The computer system of claim 8, wherein the action is selected from the group consisting of: blocking the return, allowing the return, and reimbursing a portion of a fee paid by the customer.

11. The computer system of claim 10, the instructions further causing the system to, responsive to a user selecting a return processing action of the at least one return processing actions, output to the customer a reason for the selected return processing action.

12. The computer system of claim 8, wherein the GAN is trained in an adversarial zero-sum game on a supervised learning problem using a generator model that generates example return scenarios and a discriminator model that classifies examples as either real or fake.

13. The computer system of claim 12, wherein an alarm triggering a review by a human-in-loop is generated in the case an output of the discriminator is within a low confidence threshold, the human-in-loop providing feedback indicating an accuracy of the output of the discriminator.

14. The computer system of claim 8, the instructions further causing the system to:
verify the return processing action with a human administrator responsive to an objection from the customer; and
update the GAN responsive to verification feedback from the human administrator.

15. A computer program product for dynamically determining a validity of a return, the computer program product comprising a computer readable hardware storage device, and program instructions stored on the computer readable hardware storage device, to:
train a generative adversarial network (GAN) to detect non-genuine returns using a generator model that generates example return scenarios from a multi-dimensional matrix holding features of non-valid returns and a discriminator model trained in an adversarial zero-sum game in a supervised learning environment to identify features of non-valid returns by classifying a return as from a domain of genuine historical returns or from the generator model, wherein the example return scenarios each comprise features extracted from a plurality of different historic records of non-valid returns;
obtain a return request from a customer, a transaction history of the customer, and a set of return policy rules;
standardize features of the return request into a multi-dimensional vector having numerical values representing the features in suitable positions in the multi-dimensional vector;
apply the GAN to the standardized vector of the return request, the transaction history of the customer and the set of return policy rules being parameters of the GAN;
generate, based on the application of the GAN, a score indicating an egregiousness of the return request, wherein the generated score is fed back into the GAN to reinforce learning;
rank a set of return processing action recommendations, each recommendation citing a theorized reason for the customer initiating the return request based on features of the return request standardized into the multi-dimensional vector; and
recommend at least one return processing action with supporting theorized return reasoning based on an output of the GAN, the recommendation being an optimal return action based on the features and comprising a partial return that is proportional to the egregiousness score.

16. The computer program product of claim 15, the parameters of the GAN further comprising: a past returned order history of the customer, a number of days after which the customer returned past orders, a context of the return request, and metadata about previous items bought and returned.

17. The computer program product of claim 15, wherein the action is selected from the group consisting of: blocking the return, allowing the return, and reimbursing a portion of a fee paid by the customer, and wherein, responsive to a user selecting a return processing action of the at least one return processing actions, outputting a to the customer a reason for the selected return processing action.

18. The computer program product of claim 15, wherein the GAN is trained in an adversarial zero-sum game on a supervised learning problem using a generator model that generates example return scenarios and a discriminator model that classifies examples as either real or fake.

19. The computer program product of claim 15, wherein an alarm triggering a review by a human-in-loop is generated in the case an output of the discriminator is within a low confidence threshold, the human-in-loop providing feedback indicating an accuracy of the output of the discriminator.

20. The computer program product of claim 15, the computer readable storage device further comprising instructions to:
   verify the return processing action with a human administrator responsive to an objection from the customer; and
   update the GAN responsive to verification feedback from the human administrator.

* * * * *